US012389236B2

(12) United States Patent
Wang et al.

(10) Patent No.: US 12,389,236 B2
(45) Date of Patent: Aug. 12, 2025

(54) RANDOM ACCESS CHANNEL FREQUENCY MULTIPLEXING FOR A NON-TERRESTRIAL NETWORK

(71) Applicant: QUALCOMM Incorporated, San Diego, CA (US)

(72) Inventors: Xiao Feng Wang, San Diego, CA (US); Iyab Issam Sakhnini, San Diego, CA (US); Jun Ma, San Diego, CA (US); Huilin Xu, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 16/824,137

(22) Filed: Mar. 19, 2020

(65) Prior Publication Data
US 2020/0314912 A1    Oct. 1, 2020

Related U.S. Application Data

(60) Provisional application No. 62/826,463, filed on Mar. 29, 2019.

(51) Int. Cl.
*H04W 74/0833*  (2024.01)
*H04W 16/28*  (2009.01)

(52) U.S. Cl.
CPC ....... *H04W 74/0833* (2013.01); *H04W 16/28* (2013.01)

(58) Field of Classification Search
CPC ............. H04W 74/0833; H04W 16/28; H04W 74/006; H04B 7/18519; H04B 7/0617
See application file for complete search history.

(56) References Cited

U.S. PATENT DOCUMENTS

| 6,112,085 A * | 8/2000 | Garner ............... H04B 7/18567 455/430 |
| 6,317,583 B1 * | 11/2001 | Wolcott ............ H04B 7/18539 455/12.1 |
| 6,912,085 B2 | 6/2005 | Hakomori et al. |
| 10,952,246 B2 * | 3/2021 | Kim ..................... H04B 7/0695 |
| 11,191,108 B2 | 11/2021 | Islam et al. |

(Continued)

FOREIGN PATENT DOCUMENTS

| EP | 0889604 A2 * | 1/1999 | ............... H04B 7/15 |
| WO | 2016205765 A1 | 12/2016 | |

(Continued)

OTHER PUBLICATIONS

International Search Report and Written Opinion—PCT/US2020/023785—ISA/EPO—Jun. 12, 2020.

*Primary Examiner* — Chuong M Nguyen
(74) *Attorney, Agent, or Firm* — Arun Swain

(57) ABSTRACT

Various aspects of the present disclosure generally relate to wireless communication. In some aspects, a user equipment (UE) may receive configuration information identifying locations of respective random access channel (RACH) resources for a plurality of beams associated with a non-terrestrial network, wherein the plurality of beams are associated with respective frequency regions. The UE may perform a RACH procedure with regard to the selected beam using a RACH resource associated with the selected beam. Numerous other aspects are provided.

30 Claims, 10 Drawing Sheets

(56) References Cited

U.S. PATENT DOCUMENTS

| | | | | |
|---|---|---|---|---|
| 2008/0240028 | A1* | 10/2008 | Ding | H04W 74/002 370/329 |
| 2014/0064067 | A1* | 3/2014 | Drewes | H04L 5/0044 370/329 |
| 2016/0316376 | A1* | 10/2016 | Wen | H04L 27/2605 |
| 2018/0049245 | A1* | 2/2018 | Islam | H04L 5/0051 |
| 2018/0115990 | A1* | 4/2018 | Abedini | H04L 27/2655 |
| 2018/0139787 | A1 | 5/2018 | Islam et al. | |
| 2018/0235005 | A1* | 8/2018 | Ansari | H04L 27/0006 |
| 2018/0307555 | A1 | 10/2018 | Zwart | |
| 2018/0368199 | A1* | 12/2018 | Zeng | H04W 88/10 |
| 2019/0141546 | A1* | 5/2019 | Zhou | H04B 7/0626 |
| 2019/0158241 | A1* | 5/2019 | Behravan | H04L 5/0044 |
| 2019/0260530 | A1* | 8/2019 | Yi | H04L 5/0098 |
| 2019/0268118 | A1* | 8/2019 | Sadiq | H04B 7/0617 |
| 2019/0349916 | A1* | 11/2019 | Fei | H04L 5/0037 |
| 2020/0344034 | A1* | 10/2020 | Moon | H04L 5/10 |
| 2021/0092008 | A1* | 3/2021 | Yi | H04J 1/02 |

FOREIGN PATENT DOCUMENTS

| | | | |
|---|---|---|---|
| WO | 2017072745 | A1 | 5/2017 |
| WO | 2018089265 | | 5/2018 |

* cited by examiner

RANDOM ACCESS CHANNEL FREQUENCY MULTIPLEXING FOR A NON-TERRESTRIAL NETWORK

CROSS-REFERENCE TO RELATED APPLICATION

This patent application claims priority to U.S. Provisional Patent Application No. 62/826,463, filed on Mar. 29, 2019, entitled "RANDOM ACCESS CHANNEL FREQUENCY MULTIPLEXING FOR A NON-TERRESTRIAL NETWORK," and assigned to the assignee hereof. The disclosure of the prior Application is considered part of and is incorporated by reference in this Patent Application.

FIELD OF THE DISCLOSURE

Aspects of the present disclosure generally relate to wireless communication, and to techniques and apparatuses for random access channel (RACH) frequency multiplexing for a non-terrestrial network (NTN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include receiving configuration information identifying locations of respective random access channel (RACH) resources for a plurality of beams associated with a non-terrestrial network, wherein the plurality of beams are associated with respective frequency regions; and performing a RACH procedure with regard to the selected beam using a RACH resource associated with the selected beam.

In some aspects, a UE for wireless communication may include memory; one or more processors coupled to the memory; and instructions stored in the memory and operable, when executed by the one or more processors, to cause the UE to receive configuration information identifying locations of respective RACH resources for a plurality of beams associated with a non-terrestrial network, wherein the plurality of beams are associated with respective frequency regions; and perform a RACH procedure with regard to the selected beam using a RACH resource associated with the selected beam.

In some aspects, a method of wireless communication, performed by a base station, may include transmitting configuration information for a plurality of beams for a non-terrestrial network, wherein the configuration information identifies respective RACH resources for the plurality of beams, and wherein the plurality of beams are associated with respective frequency regions; and performing a RACH procedure with regard to a selected beam, of the plurality of beams, using a RACH resource associated with the selected beam.

In some aspects, a base station for wireless communication may include memory; one or more processors coupled to the memory; and instructions stored in the memory and operable, when executed by the one or more processors, to cause the base station to transmit configuration information for a plurality of beams for a non-terrestrial network, wherein the configuration information identifies respective RACH resources for the plurality of beams, and wherein the plurality of beams are associated with respective frequency regions; and perform a RACH procedure with regard to a selected beam, of the plurality of beams, using a RACH resource associated with the selected beam.

In some aspects, a non-transitory computer-readable medium may store one or more instructions for wireless communication that, when executed by one or more processors of a base station, may cause the one or more processors to: receive configuration information identifying locations of respective RACH resources for a plurality of beams associated with a non-terrestrial network, wherein the plurality of beams are associated with respective frequency regions; and perform a RACH procedure with regard to the selected beam using a RACH resource associated with the selected beam.

In some aspects, a non-transitory computer-readable medium may store one or more instructions for wireless communication that, when executed by one or more processors of a base station, may cause the one or more processors to: transmit configuration information for a plurality of beams for a non-terrestrial network, wherein the configuration information identifies respective RACH resources for the plurality of beams, and wherein the plurality of beams are associated with respective frequency regions; and perform a RACH procedure with regard to a selected beam, of the plurality of beams, using a RACH resource associated with the selected beam.

In some aspects, an apparatus for wireless communication may include means for receiving configuration information identifying locations of respective RACH resources for a plurality of beams associated with a non-terrestrial network, wherein the plurality of beams are associated with respective frequency regions; and means for performing a RACH procedure with regard to the selected beam using a RACH resource associated with the selected beam.

In some aspects, an apparatus for wireless communication may include means for transmitting configuration information for a plurality of beams for a non-terrestrial network, wherein the configuration information identifies respective RACH resources for the plurality of beams, and wherein the plurality of beams are associated with respective frequency regions; and means for performing a RACH procedure with regard to a selected beam, of the plurality of beams, using a RACH resource associated with the selected beam.

Aspects generally include a method, apparatus, system, computer program product, non-transitory computer-readable medium, user equipment, base station, wireless communication device, relay station, ground station, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
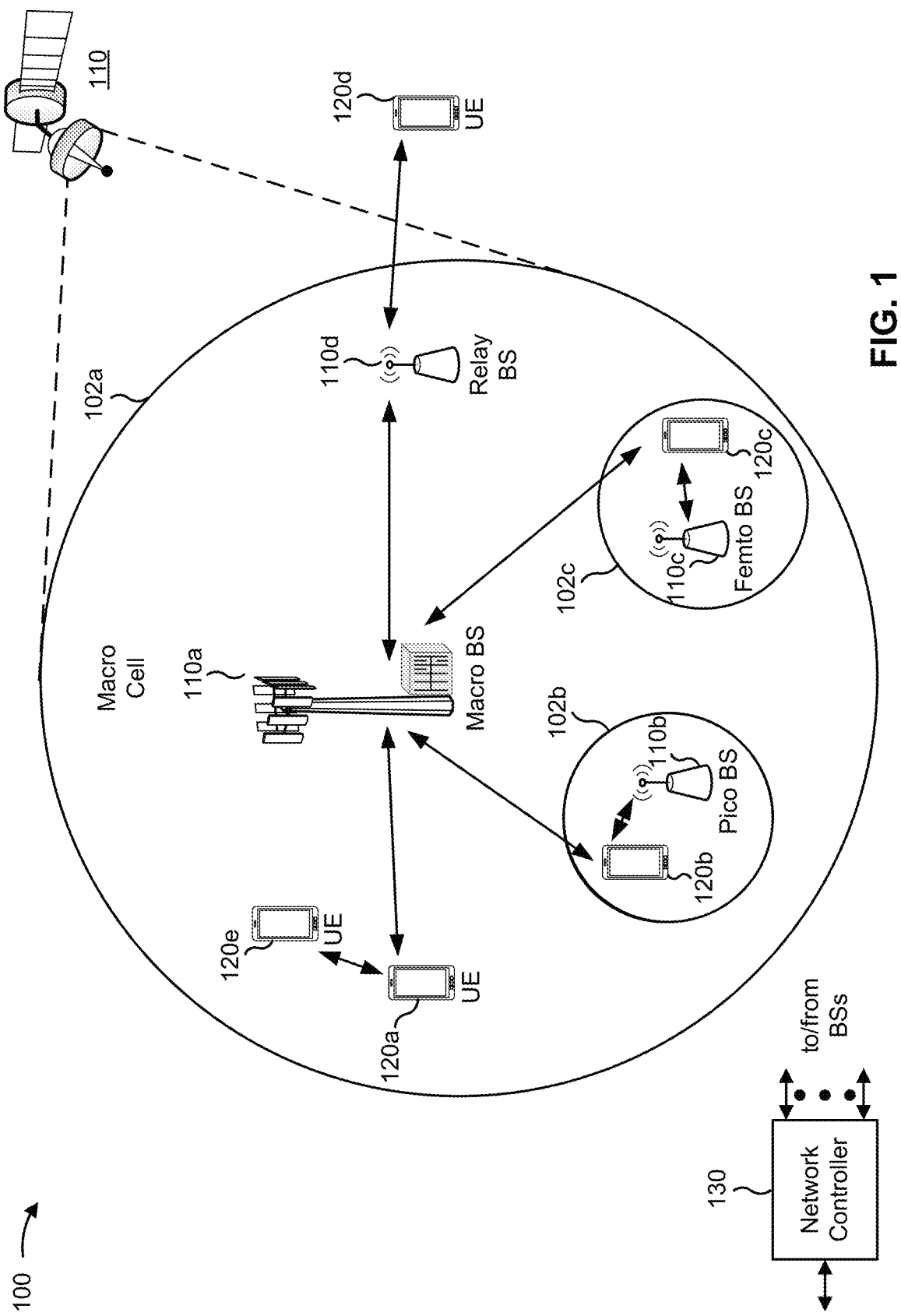
FIG. 1 is a block diagram conceptually illustrating an example of a wireless communication network, in accordance with various aspects of the present disclosure.

A non-terrestrial base station (referred to hereafter as a BS or a base station) may provide access to a non-terrestrial network for UEs or ground stations. As used herein, a ground station may refer to a radio station designed for communication with a non-terrestrial BS via a non-terrestrial network. A reference to a UE herein can also refer to a ground station. Furthermore, a reference to a BS can also refer to a relay station.

The BS may transmit beams using multiple antennas that each cover a surface area. The footprint of a beam transmitted by an antenna can be defined as a cell. A UE may acquire the BS based at least in part on searching for a synchronization signal using a spatial technique (e.g., by pointing a receive antenna beam towards the satellite), a frequency technique (e.g., by scanning different frequencies until the BS's signal is acquired), a timing technique (e.g., by searching for a starting time of a signal), a sequence-based technique (e.g., by identifying a code sequence of a synchronization signal), and/or the like. Examples of a synchronization signal include a synchronization signal block (SSB), a primary synchronization signal (PSS), a secondary synchronization signal (SSS), a physical broadcast channel (PBCH), and/or the like.

Once the UE detects a beam, the UE and the BS may perform a random access channel (RACH) procedure, such as a physical RACH (PRACH) procedure, to access the network. In the RACH procedure, the UE may transmit a RACH preamble on a particular set of resources. A set of RACH resources may be associated with a RACH occasion. For example, a RACH occasion may correspond to one or more RACH resources for one or more beams. However, RACH resource and RACH occasion may be used interchangeably herein.

In a non-terrestrial network, PRACH preamble resources may be larger than in a terrestrial network, such as an LTE network or a 5G/NR terrestrial network. This may be due to non-terrestrial networks being associated with larger Doppler shifts (and thus a wider subcarrier spacing) and longer delays than a terrestrial network, which may necessitate a larger frequency allocation and a longer time allocation for the RACH preamble. Also, a larger number of UEs may be expected to perform handovers concurrently in a non-terrestrial network, particularly a non-terrestrial network in which the cells are in constant motion (e.g., when the cells are provided by a satellite in low earth orbit or mid earth orbit). Furthermore, the cell may be larger than a terrestrial network cell, which may mean that a larger number of UEs may be expected to perform RACH procedures on the cell. In such cases, it may be difficult for a BS to multiplex PRACH resources within the frequency region used for other channels (e.g., data channels, control channels, and/or the like), which may lead to fragmented data transmissions. Furthermore, to reduce the overhead associated with large numbers of UEs performing RACH procedures, it may be beneficial to multiplex RACH resources for some beams on the same time and/or frequency resources.

Some techniques and apparatuses described herein provide techniques for configuring RACH occasions of multiple beams in a non-terrestrial network. For example, some techniques and apparatuses described herein provide for the configuration of multiple RACH resources to be provided in respective frequency regions of corresponding beams, thereby reducing frequency retune disruptions and reducing impact on overall operating bandwidth. As another example, some techniques and apparatuses described herein provide the configuration of RACH resources on a bandwidth part or subband that does not overlap frequency regions of the respective beams, or on a frequency region of a beam of the respective beams, or on a combination thereof. These options are described in more detail elsewhere herein. Furthermore, some techniques and apparatuses described herein provide guard periods for a RACH procedure when the RACH resource is in a different subband or frequency region than a beam's frequency region. Even further, some techniques and apparatuses described herein provide multiplexing of RACH resources, thereby conserving air interface resources. Thus, efficiency of resource utilization is improved and data transmission continuity is improved.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

In some aspects, as shown, a cell may be provided by a base station 110 of a non-terrestrial network. As used herein, a non-terrestrial network may refer to a network for which access is provided by a non-terrestrial base station, such as a base station carried by a satellite, a balloon, a dirigible, an airplane, an unmanned aerial vehicle, a high altitude platform station, and/or the like.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like In some aspects, a relay station may be implemented using a non-terrestrial platform, similarly to the base station described above.

Wireless network 100 may be a heterogeneous network that includes BSs of different types, e.g., macro BSs, pico BSs, femto BSs, relay BSs, and/or the like These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like A frequency may also be referred to as a carrier, a frequency channel, and/or the like Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
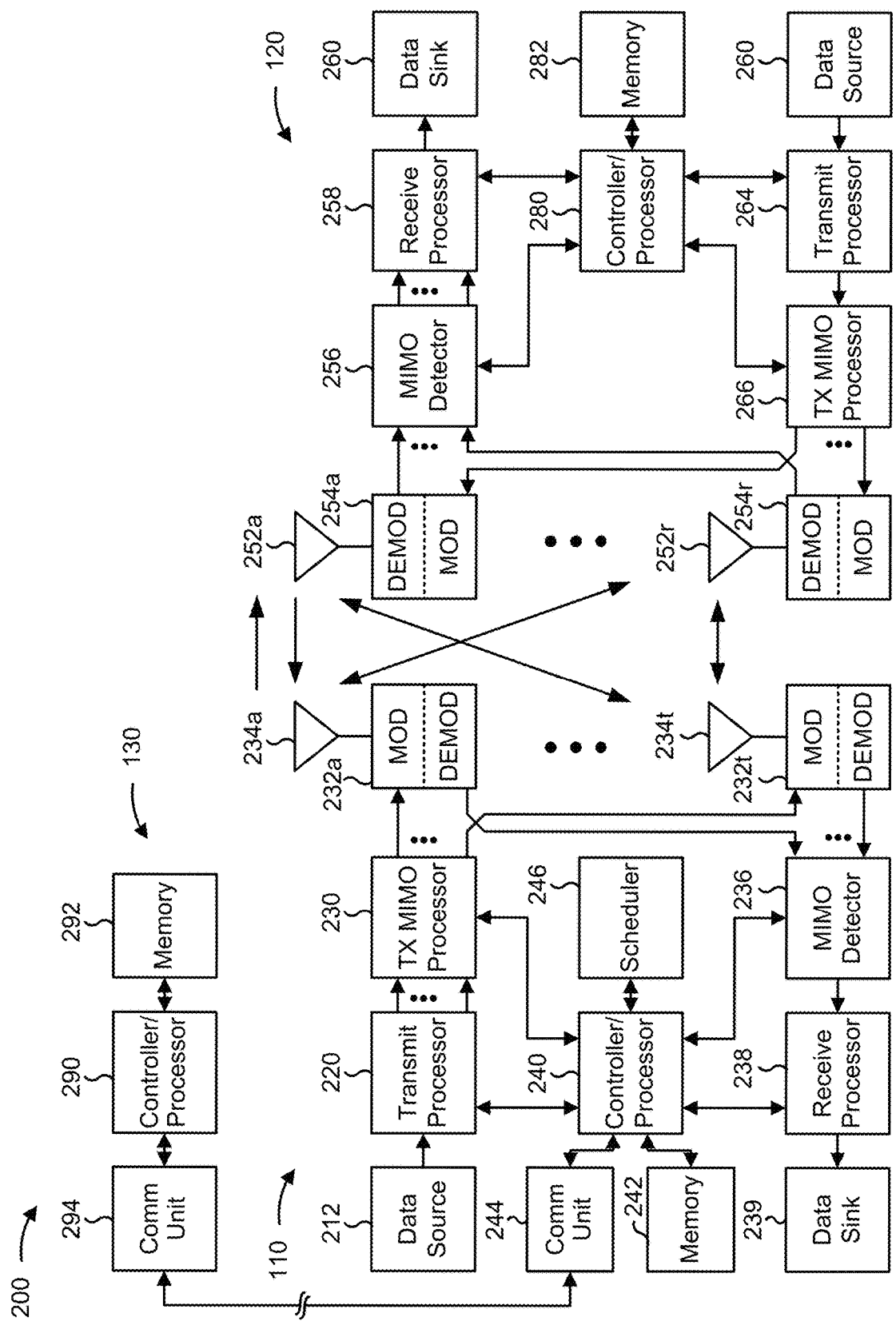
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with random access channel frequency multiplexing for a non-terrestrial network, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

Figure 9:
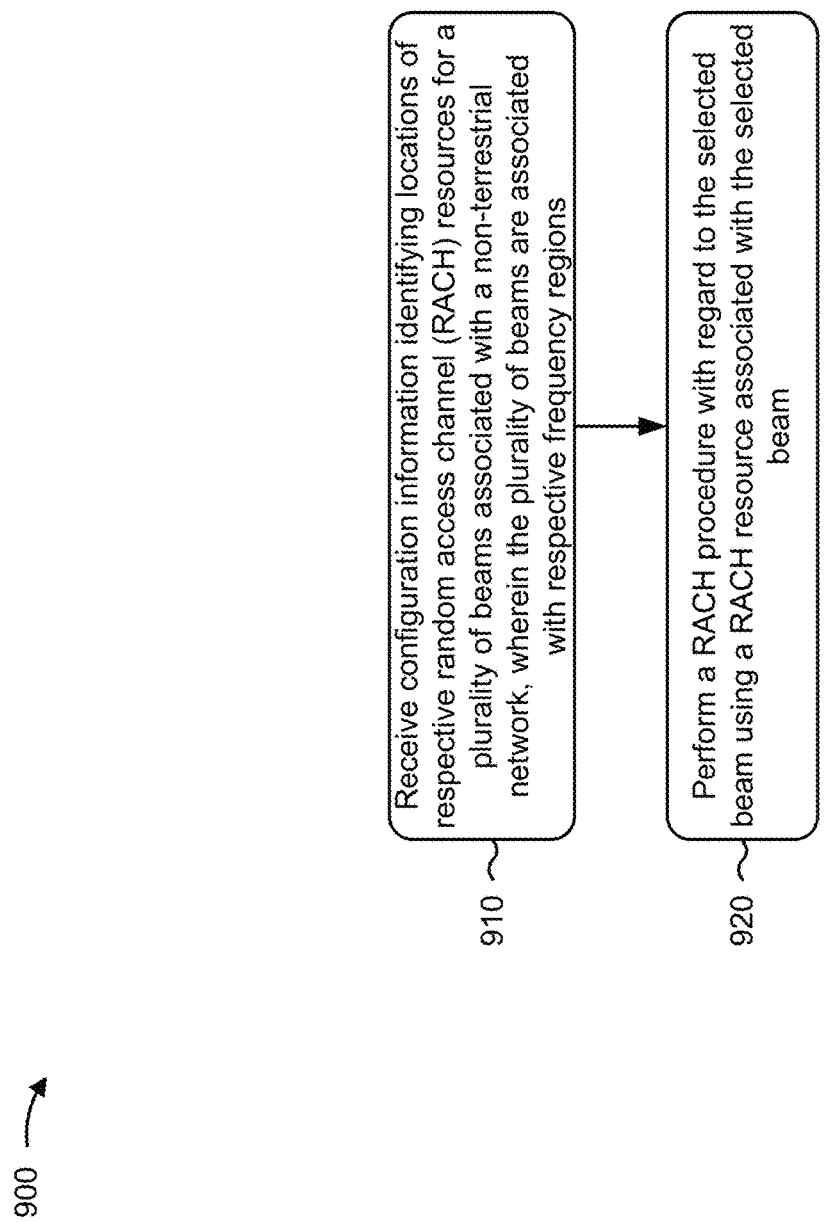
FIG. 9 is a diagram illustrating an example process performed, for example, by a user equipment, in accordance with various aspects of the present disclosure.

The stored program codes, when executed by processor 280 and/or other processors and modules at UE 120, may cause the UE 120 to perform operations described with respect to process 900 of FIG. 9 and/or other processes as described herein. The stored program codes, when executed by processor 240 and/or other processors and modules at base station 110, may cause the base station 110 to perform operations described with respect to process 1000 of FIG. 10 and/or other processes as described herein. A scheduler 246 may schedule UEs for data transmission on the downlink and/or uplink.

In some aspects, UE 120 may include means for receiving configuration information identifying locations of respective random access channel (RACH) resources for a plurality of beams associated with a non-terrestrial network, wherein the plurality of beams are associated with respective frequency regions; means for performing a RACH procedure with regard to the selected beam using a RACH resource associated with the selected beam; means for performing an operation to resolve a conflict between the RACH resource and another uplink transmission in the expanded time window; means for receiving information indicating an association between a synchronization signal block (SSB) time index of one or more beams and one or more corresponding RACH resources associated with the one or more beams; means for identifying the RACH resource associated with a beam of the one or more beams based at least in part on the information indicating the association; means for identifying a RACH resource, of the respective RACH resources, based at least in part on an association between a synchronization signal block (SSB) time index of the selected beam and the RACH resource associated with the selected beam; and/or the like. In some aspects, such means may include one or more components of UE 120 described in connection with FIG. 2.

In some aspects, base station 110 may include means for transmitting configuration information for a plurality of beams for a non-terrestrial network, wherein the configuration information identifies respective random access channel (RACH) resources for the plurality of beams, and wherein the plurality of beams are associated with respective frequency regions; means for performing a RACH procedure with regard to a selected beam, of the plurality of beams, using a RACH resource associated with the selected beam; means for transmitting information indicating an association between a synchronization signal block (SSB) time index of the selected beam and the RACH resource associated with the selected beam; means for identifying the RACH resource based at least in part on an association between a synchronization signal block (SSB) time index of the selected beam and the RACH resource associated with the selected beam; and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3:
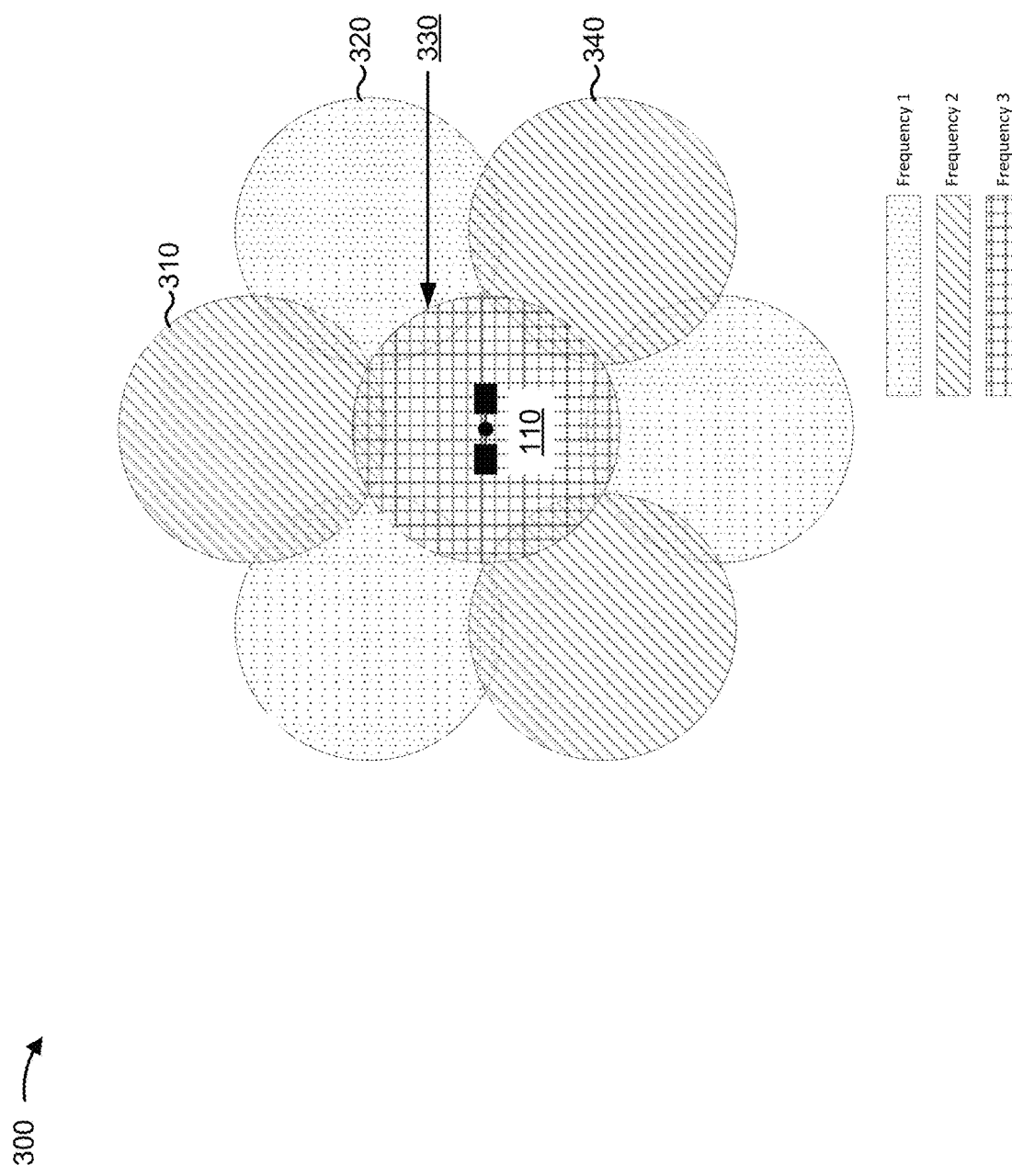
FIG. 3 is a diagram illustrating an example of cells provided by a base station of a non-terrestrial network, in accordance with various aspects of the present disclosure.

FIG. 3 is a diagram illustrating an example 300 of cells 310, 320, 330, and 340 provided by a base station of a non-terrestrial network, in accordance with various aspects of the present disclosure. The center frequencies associated with the cells are indicated by the fill of the corresponding cell. Each cell may be provided by a respective beam of a BS (e.g., BS 110). For example, the BS may generate multiple beams associated with respective frequency regions. These cells may not necessarily be circular. In some aspects, a beam may be an analog beam (e.g., generated by a cone antenna or a different type of antenna). In some aspects, the beam may be a digital beam, which may be formed by signal manipulation across an antenna array.

If N is the number of beams provided by a BS, and M is the number of bandwidth parts or subbands provided by the beams, where N is greater than or equal to M, the BS may use N/M beams per subband or bandwidth part. In some aspects, the BS may use one beam per frequency region (e.g., subband or bandwidth part), and frequency regions of the beams may be configured not to overlap in the spatial domain (e.g., cells 310 and 320 may be associated with different frequency regions since cells 310 and 320 spatially overlap each other, whereas cells 310 and 340 may use the same frequency region since cells 310 and 320 do not spatially overlap each other).

A RACH procedure for a UE covered by a cell may be performed via the beam that provides (e.g., covers) the cell. According to the techniques and apparatuses described herein, a RACH resource for the RACH procedure (e.g., a resource for a RACH preamble of the RACH procedure and/or for other communications of the RACH procedure) may be provided in a frequency region of the corresponding beam or outside of the frequency region of the corresponding beam. For example, the RACH resources of the beams of BS 110 may be configured independently (e.g., on different frequency regions) or jointly (e.g., on a same frequency region). Furthermore, in some aspects, the RACH resources of the beams of BS 110 may be multiplexed (e.g., time division multiplexed, frequency division multiplexed, code division multiplexed, and/or the like), which may conserve air interface resources and reduce interruption of the frequency regions of the beams.

As used herein, a frequency region may refer to a configured bandwidth of a beam or a cell bandwidth of the beam with which data is transmitted. For example, a frequency region may correspond to a bandwidth part or subband of a beam.

As indicated above, FIG. 3 is provided as an example. Other examples may differ from what is described with respect to FIG. 3.

Figure 4:
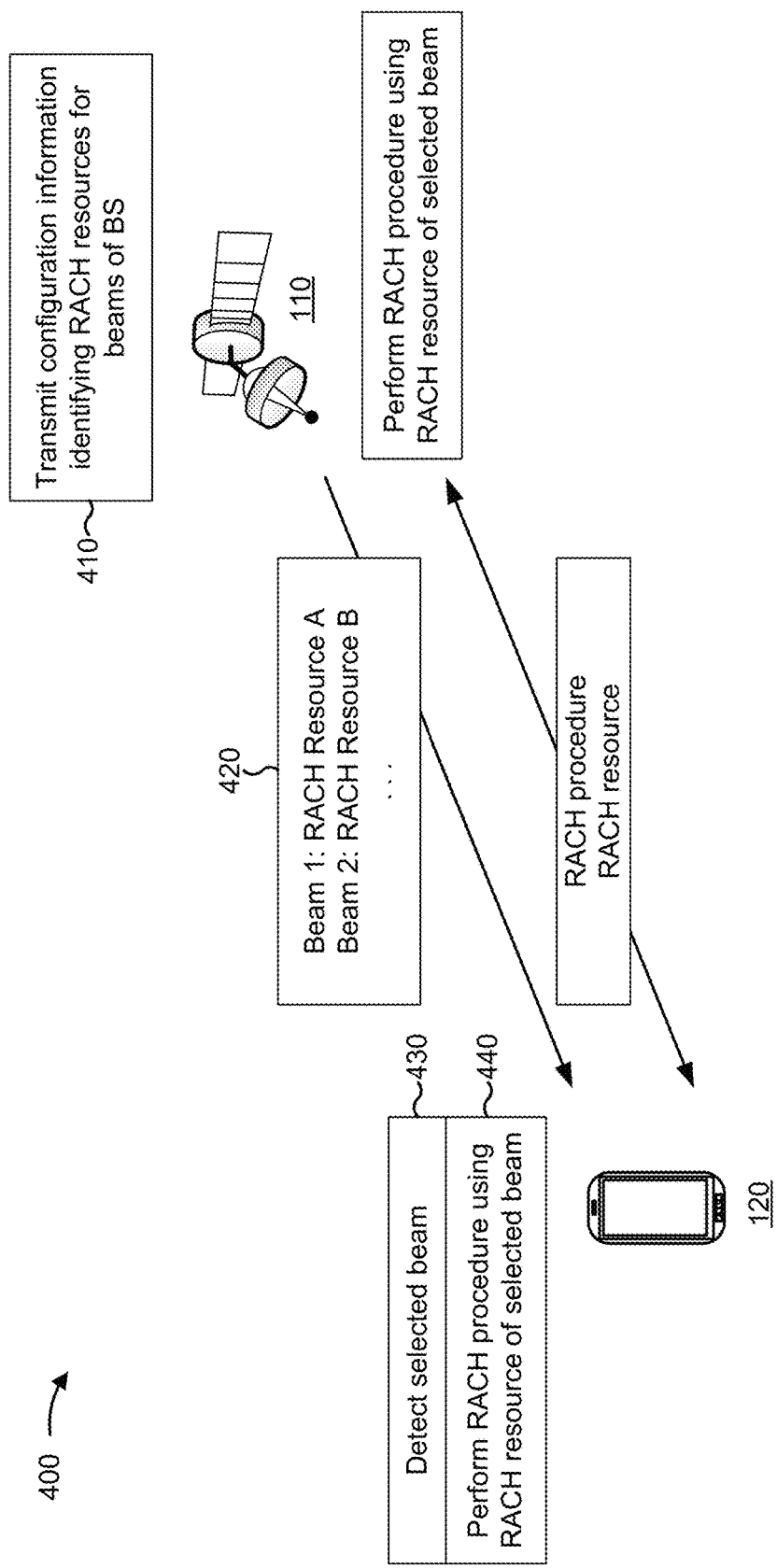
FIG. 4 is a diagram illustrating an example of configuring random access channel (RACH) resources for beams of a non-terrestrial network, in accordance with various aspects of the present disclosure.

FIG. 4 is a diagram illustrating an example 400 of configuring random access channel (RACH) resources for beams of a non-terrestrial network, in accordance with various aspects of the present disclosure. As shown, FIG. 4 includes a BS 110 and a UE 120. In some aspects, BS 110 may include a relay station. In some aspects, UE 120 may include a ground station.

As shown in FIG. 4, and by reference number 410, the BS 110 may transmit configuration information that identifies RACH resources for beams to be transmitted by the BS 110. For example, the configuration information may be transmitted using radio resource configuration (RRC) information, downlink control information (DCI), a system information block (SIB), broadcast information, and/or the like. In some aspects, the configuration information may indicate a mapping between an SSB and a corresponding RACH resource, as described in more detail elsewhere herein. The configuration information is described in more detail in connection with reference number 420.

As shown by reference number 420, the configuration information may identify RACH resources for corresponding beams that may be transmitted by the BS 110. In other words, the configuration information may be beam-specific. For example, the configuration information may identify a first RACH resource (e.g., RACH Resource A) for a first beam (e.g., Beam 1), a second RACH resource (e.g., RACH Resource B) for a second beam (e.g., Beam 2), and so on. Thus, the RACH resources of the beams may be configured independently of each other. By configuring the RACH resources independently, improved flexibility in RACH configuration may be achieved. This may be particularly helpful in the case of NTN communications, wherein different BSs may be associated with significantly different capabilities, so a uniform RACH configuration may not be ideal or feasible. In some aspects, the RACH resources for the beams may be configured jointly (e.g., on a same frequency region or using a single configuration that is common to two or more beams), which may conserve resources associated with independently configuring the RACH resources. Particular configurations of the RACH resources are described in connection with FIGS. 5-8.

As shown by reference number 430, the UE 120 may detect a selected beam of the plurality of beams provided by the BS 110. For example, the UE 120 may detect an SSB of the selected beam, which may be transmitted by a corresponding antenna. Thus, the UE 120 may determine to access the NTN using the selected beam. In some aspects, the UE 120 may identify a RACH resource (and/or a RACH occasion associated with the RACH resource) based at least in part on an SSB index of the selected beam, as described in more detail in connection with FIG. 6.

As shown by reference number 440, the UE 120 and the BS 110 may perform the RACH procedure with the BS 110 using the RACH resource of the selected beam. For example, the UE 120 may transmit a RACH preamble using the RACH resource, may receive a RACH response using the RACH resource, and/or the like. The BS 110 may monitor the RACH resource for the RACH preamble, and may transmit a RACH response based at least in part on the RACH preamble. In some aspects, the UE 120 may use a guard period for the transmission of the RACH resource, such as when the BS 110 is to retune to the frequency region associated with the RACH resource, as described in more detail in connection with FIG. 7.

As indicated above, FIG. 4 is provided as an example. Other examples may differ from what is described with respect to FIG. 4.

Figure 5:
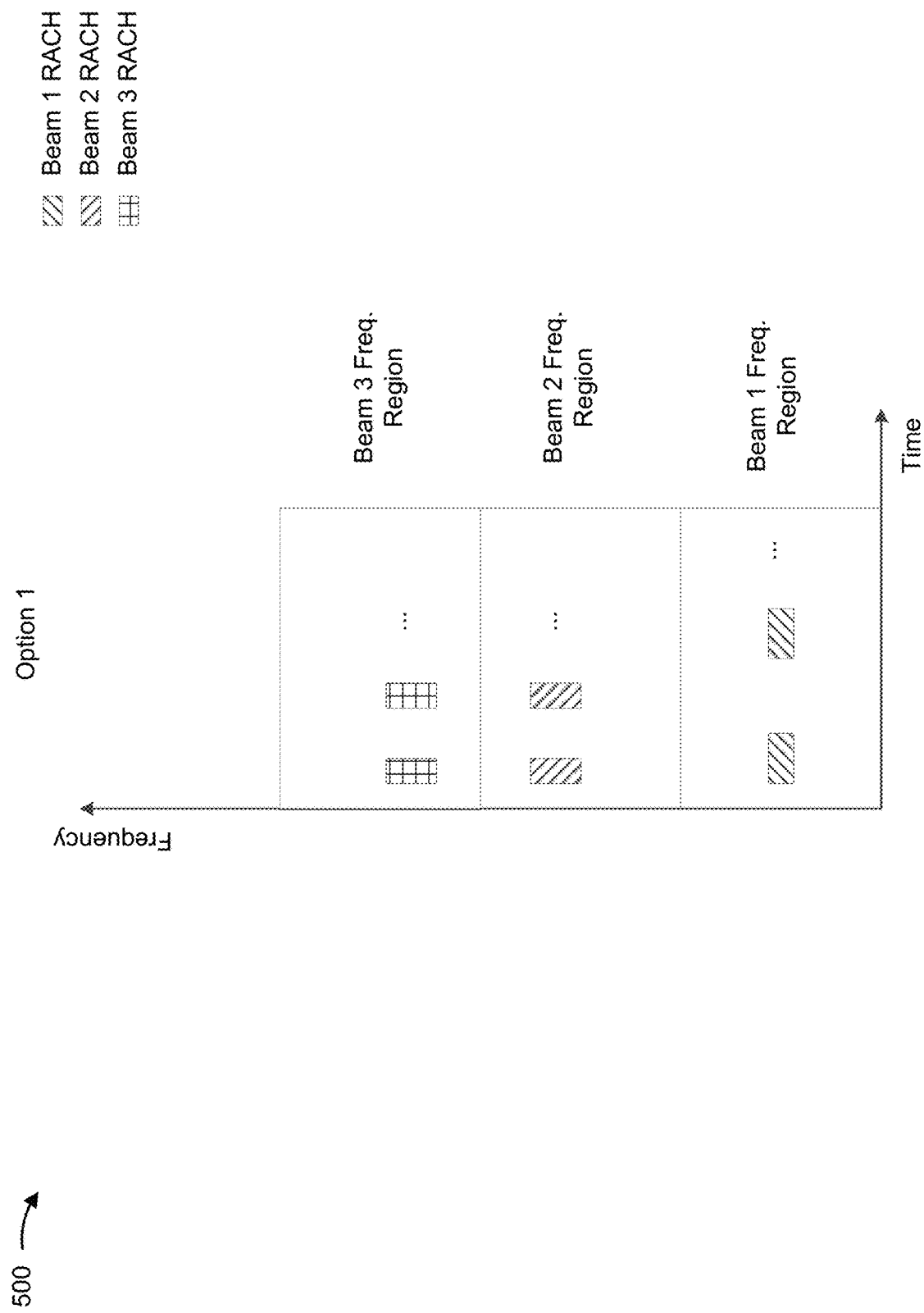
FIG. 5 is a diagram illustrating an example of a RACH resource configuration wherein RACH resources are provided in frequency regions of respective beams, in accordance with various aspects of the present disclosure.

FIG. 5 is a diagram illustrating an example 500 of a RACH resource configuration wherein RACH resources are provided in frequency regions of respective beams, in accordance with various aspects of the present disclosure. As shown in FIG. 5, in some aspects, a RACH resource of each beam (shown as Beam 1/2/3 RACH) may be located in a frequency region (e.g., bandwidth part, subband, and/or the like). The configuration shown in FIG. 5 is referred to herein as Option 1 for clarity of description.

Figure 6:
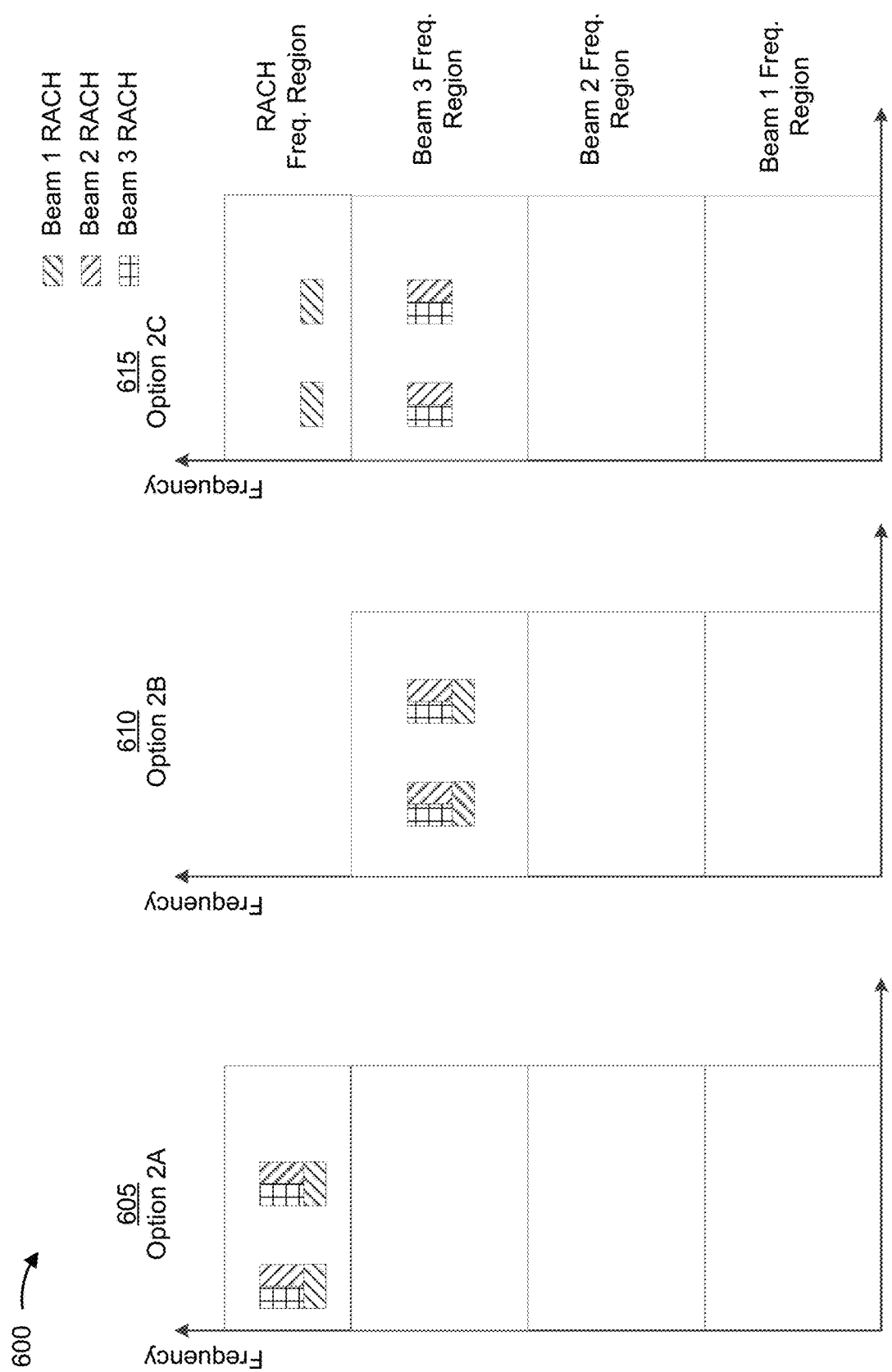
FIG. 6 is a diagram illustrating examples of RACH resource configurations wherein at least some RACH resources are provided outside frequency regions of respective beams, in accordance with various aspects of the present disclosure.

FIG. 6 is a diagram illustrating examples 600 of RACH resource configurations wherein at least some RACH resources are provided outside frequency regions of respective beams, in accordance with various aspects of the present disclosure. FIG. 6 illustrates a first example 605 (referred to as Option 2A), a second example 610 (referred to as Option 2B), and a third example 615 (referred to as Option 2C).

In Option 2A, the RACH resources for the bands are provided outside of any frequency region of all of the bands. For example, the RACH resources are provided in a RACH frequency region (e.g., bandwidth part (BWP), subband (SB), and/or the like). This may be a frequency region used only to carry RACH messaging, a frequency region used for RACH and synchronization messaging, a frequency region of a cell other than the cells provided by Beams 1, 2, and 3, and/or the like. In Option 2B, the RACH resource for the beams are provided in one of the frequency regions of the beams. Here, the RACH resources for each of the beams are provided in the frequency region of Beam 3. Option 2C may be considered a combination of Option 2A and Option 2B, wherein some RACH resources are provided in the RACH frequency region and other RACH resources are provided in the frequency region of one or more of the beams.

Options 1 and 2B may use less bandwidth than Options 2A and 2C since no PRACH frequency region is provided. Furthermore, Option 1 may not require a frequency retuning operation on the part of the antennas that transmit Beams 1 through 3, thereby reducing delay and enabling random access without a guard period. Option 2A may provide increased flexibility and simplicity in a scheduler design and may increase the available resources on Beams 1 through 3. Options 2A, 2B, and 2C may provide the ability to multiplex more than one RACH resource on the same frequency/time resource, which may improve efficiency of resource allocation. Furthermore, Options 2B and 2C may provide increased resource availability for beams whose frequency regions are not used for the RACH resources.

In some aspects, such as for Options 2A, 2B, and/or 2C, and when a common SSB frequency region is used for the plurality of beams, an association between SSB indices and RACH resources (e.g., RACH occasions) can be defined. Thus, a UE that receives an SSB on a particular time index may identify the corresponding RACH resource based at least in part on the association, even when the RACH occasions are not contiguous to the SSB. In some aspects, the association may be identified explicitly (e.g., in the configuration information provided by the BS) or based at least in part on a mapping (e.g., a mapping defined in a specification and/or the like).

In each of Options 2A, 2B, and 2C, the RACH resources can be multiplexed with each other. For example, the RACH resources may be multiplexed in any one or more of the time domain, the frequency domain, the code domain, or another domain. This may improve resource utilization of the RACH procedure.

As indicated above, FIGS. 5 and 6 are provided as examples. Other examples may differ from what is described with respect to FIGS. 5 and 6.

Figure 7:
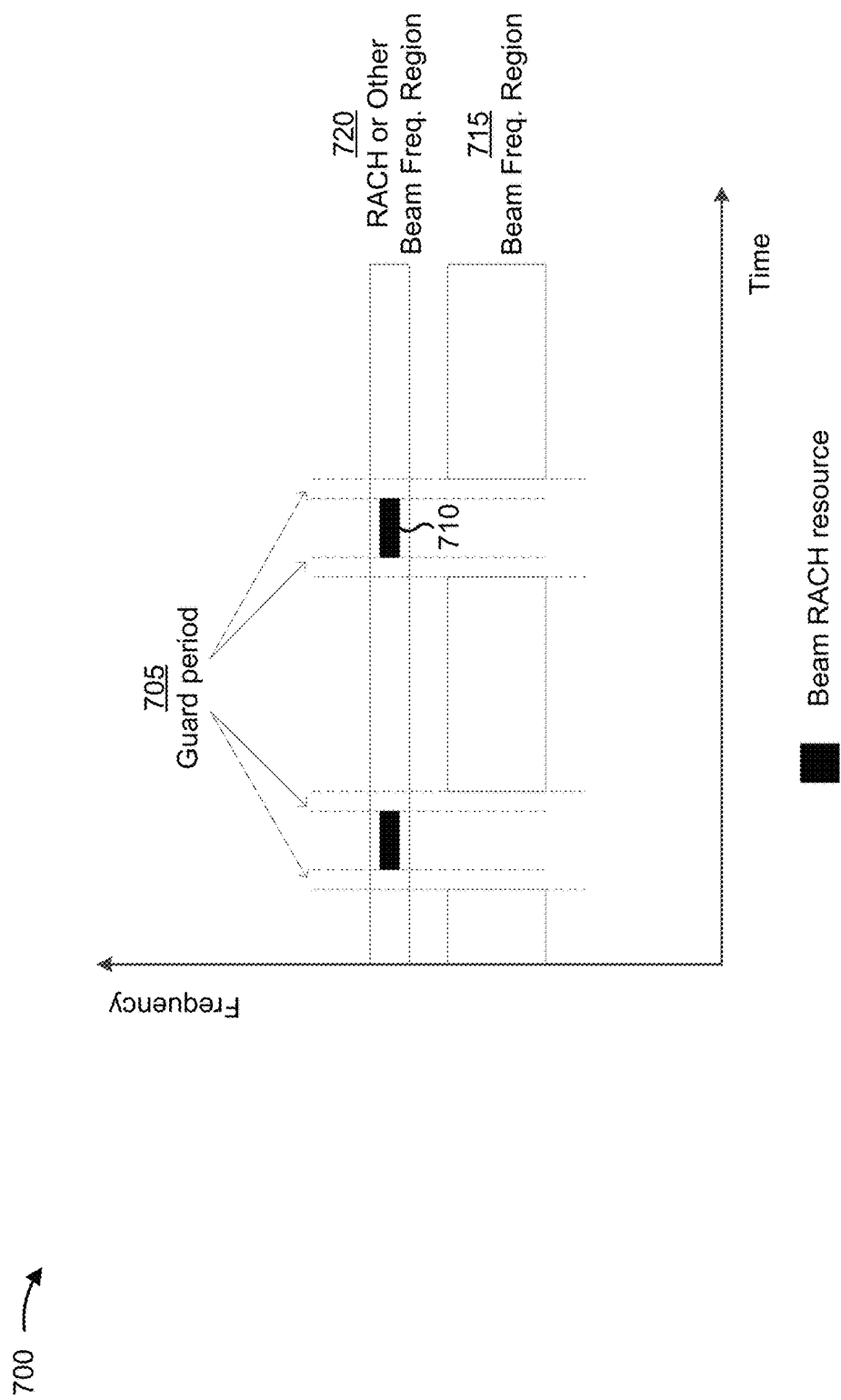
FIG. 7 is a diagram illustrating an example of a guard period to be used in connection with a RACH procedure, in accordance with various aspects of the present disclosure.

FIG. 7 is a diagram illustrating an example 700 of a guard period to be used in connection with a RACH procedure, in accordance with various aspects of the present disclosure. For example, for the purpose of example 700, base stations may be of a first type or a second type. The first type is a BS with a bandwidth capability that supports a bandwidth wider than the BS's frequency region (including the PRACH frequency region, if applicable). The second type is a BS with a bandwidth capability that does not support a bandwidth wider than the BS's frequency region.

In order to receive a RACH preamble from a UE that is outside of the BS's frequency region, a BS of the first type may not need to retune to a frequency region of the RACH preamble. However, a BS of the second type may retune to the frequency region of the RACH preamble. There may be some delay inherent to the frequency retuning operation. Some techniques and apparatuses described herein provide a guard period for a BS to retune from the BS's frequency region to the RACH preamble's frequency region when the BS is of the second type. For example, some techniques and apparatuses described herein may selectively use the guard period or omit the guard period based at least in part on whether the BS supports the bandwidth wider than the BS's frequency region.

The guard period is shown by reference number 705, and the RACH resource for the beam is shown by reference number 710. As shown, the RACH resource is provided outside of the beam's frequency region 715 and in a RACH frequency region 720. When the BS is of the first type, the BS may not require the guard period, so no guard period may be provided. When the BS is of the second type, the BS may need to retune to and from the RACH frequency region 720, and the guard period 705 may provide time for the retuning operation. Thus, compatibility for BSs with different capabilities is improved.

In some aspects, the guard period may be implemented by the UE. For example, the UE may be configured to use the resources shown by the guard period (e.g., the resource allocation that is wider than the RACH resource 710) as the RACH resource. In the case that other uplink data collides with the RACH resource (e.g., the guard period), the UE may perform an operation to handle or mitigate the conflict (e.g., puncturing, rate matching, dropping, and/or the like). Thus, the UE may provide a guard period for BSs that do not support a bandwidth wider than the BS's frequency region.

As indicated above, FIG. 7 is provided as an example. Other examples may differ from what is described with respect to FIG. 7.

Figure 8:
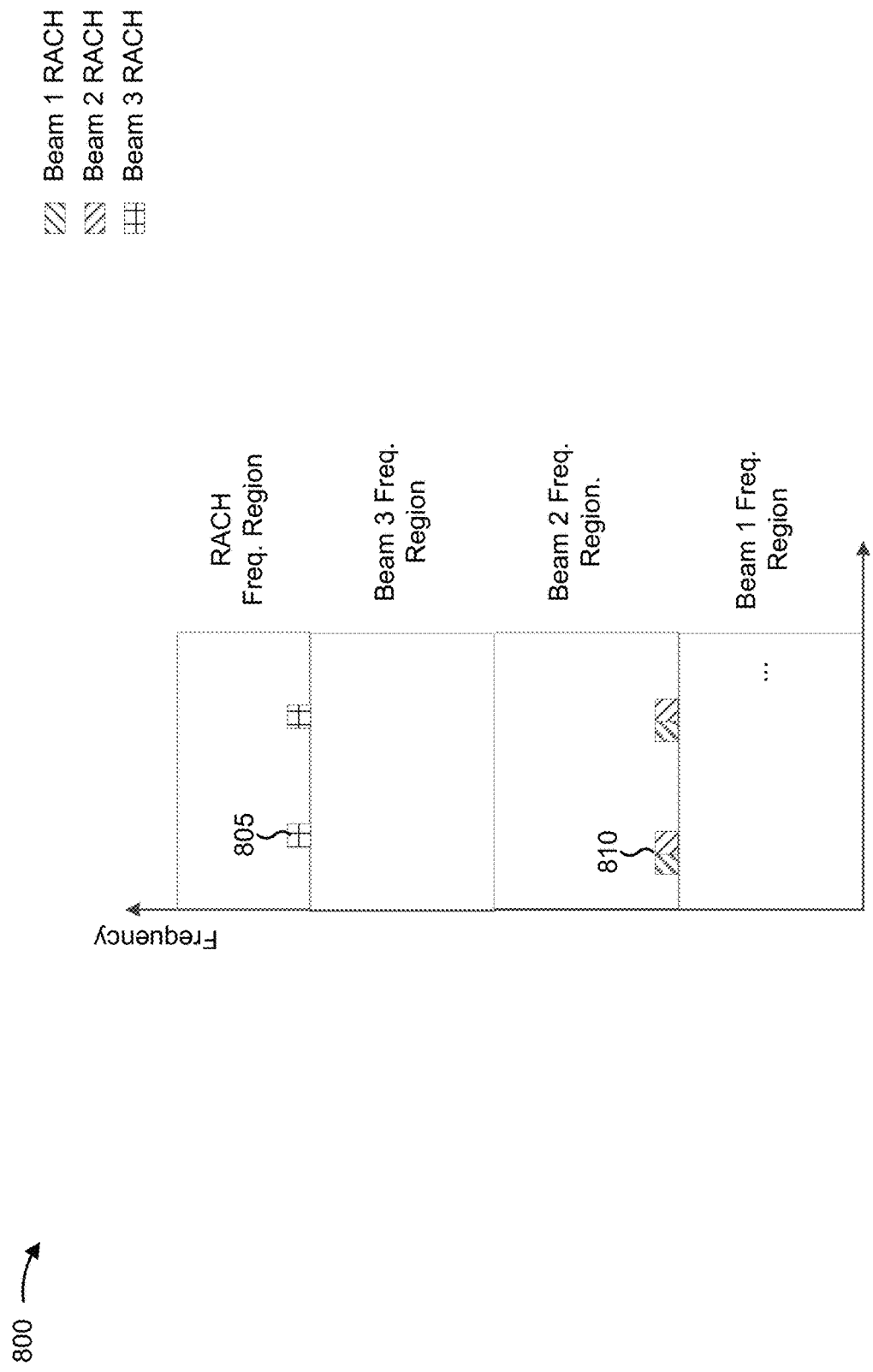
FIG. 8 is a diagram illustrating an example of a RACH resource configuration wherein RACH resources are provided adjacent to frequency regions of respective beams, in accordance with various aspects of the present disclosure.

FIG. 8 is a diagram illustrating an example 800 of a RACH resource configuration wherein RACH resources are provided adjacent to frequency regions of respective beams, in accordance with various aspects of the present disclosure. In example 800, RACH resources are provided adjacent to or in an overlapped region of the frequency region of the corresponding beam. For example, as shown by reference number 805, a RACH resource for Beam 3 is provided in a RACH frequency region adjacent to Beam 3's frequency region. Furthermore, as shown by reference number 810, RACH resources for Beam 1 and Beam 2 are provided in Beam 2's frequency region and adjacent to Beam 1's frequency region. In some aspects, the RACH resources for two beams may be provided in an overlapped area of the frequency regions of the two beams. Thus, the BS's support for additional bandwidth beyond the beam's frequency region can be reduced (e.g., minimized), thereby reducing complexity at the BS.

In some aspects, the RACH resources may be multiplexed with each other, which may reduce resource utilization of the RACH resources. For example, the RACH resources may be provided in overlapping frequency, and may be multiplexed in time, in code, and/or the like.

As indicated above, FIG. 8 is provided as an example. Other examples may differ from what is described with respect to FIG. 8.

FIG. 9 is a diagram illustrating an example process 900 performed, for example, by a user equipment, in accordance with various aspects of the present disclosure. Example process 900 is an example where a UE (e.g., user equipment 120, a ground station, and/or the like) performs operations associated with random access channel frequency multiplexing for a non-terrestrial network.

As shown in FIG. 9, in some aspects, process 900 may include receiving configuration information identifying locations of respective random access channel (RACH) resources for a plurality of beams associated with a non-terrestrial network, wherein the plurality of beams are associated with respective frequency regions (block 910). For example, the UE (e.g., using antenna 252, DEMOD 254, MIMO detector 256, receive processor 258, controller/processor 280, and/or the like) may receive configuration information identifying locations of respective random access channel (RACH) resources for a plurality of beams associated with a non-terrestrial network, as described above. In some aspects, the plurality of beams are associated with respective frequency regions.

As further shown in FIG. 9, in some aspects, process 900 may include performing a RACH procedure with regard to the selected beam using a RACH resource associated with the selected beam (block 920). For example, the UE (e.g., using controller/processor 280, transmit processor 264, TX MIMO processor 266, MOD 254, antenna 252, and/or the like) may perform a RACH procedure with regard to the selected beam using a RACH resource associated with the selected beam, as described above. In some aspects, the UE may transmit a RACH preamble using the RACH resource associated with the selected beam.

Process 900 may include additional aspects, such as any single implementation or any combination of aspects described below and/or in connection with one or more other processes described elsewhere herein.

In a first aspect, at least one RACH resource, of the respective RACH resources, is outside of a frequency region associated with a corresponding beam of the plurality of beams.

In a second aspect, alone or in combination with the first aspect, each RACH resource, of the respective RACH resources, is within a corresponding frequency region associated with a respective beam of the plurality of beams.

In a third aspect, alone or in combination with the first aspect and/or the second aspect, the respective RACH resources are configured jointly.

In a fourth aspect, alone or in combination with one or more of the first through third aspects, the respective RACH resources are configured independently from each other.

In a fifth aspect, alone or in combination with one or more of the first through fourth aspects, the configuration information is beam-specific.

In a sixth aspect, alone or in combination with one or more of the first through fifth aspects, the respective RACH resources are on a bandwidth part or subband that does not overlap a respective frequency region of any of the plurality of beams.

In a seventh aspect, alone or in combination with one or more of the first through sixth aspects, the respective RACH resources are within a particular frequency region corresponding to a particular beam of the plurality of beams.

In an eighth aspect, alone or in combination with one or more of the first through seventh aspects, one or more first RACH resources, of the respective RACH resources, are on a bandwidth part or subband that does not overlap any frequency region of the plurality of beams.

In a ninth aspect, alone or in combination with one or more of the first through eighth aspects, one or more second RACH resources, of the respective RACH resources, are in a frequency region of a particular beam of the plurality of beams.

In a tenth aspect, alone or in combination with one or more of the first through ninth aspects, the respective RACH resources are multiplexed with each other.

In an eleventh aspect, alone or in combination with one or more of the first through tenth aspects, a RACH resource associated with a selected beam, of the plurality of beams, uses an expanded time window based at least in part on a bandwidth capability of a transmitter of the selected beam (e.g., the BS 110).

In a twelfth aspect, alone or in combination with one or more of the first through eleventh aspects, the UE may perform an operation to resolve a conflict between the RACH resource and another uplink transmission in the expanded time window.

In a thirteenth aspect, alone or in combination with one or more of the first through twelfth aspects, at least one RACH resource is provided adjacent to an edge or in an overlapped area of a frequency region associated with a corresponding beam.

In a fourteenth aspect, alone or in combination with one or more of the first through thirteenth aspects, one or more first RACH resources corresponding to one or more first beams, of the plurality of beams, are multiplexed with one or more second RACH resources corresponding to one or more second beams, of the plurality of beams, in a frequency region in which the one or more first RACH resources are located.

In a fifteenth aspect, alone or in combination with one or more of the first through fourteenth aspects, the UE may receive information indicating an association between a synchronization signal block (SSB) time index of one or more beams and one or more corresponding RACH resources associated with the one or more beams; and identify the RACH resource associated with a beam of the one or more beams based at least in part on the information indicating the association.

In a sixteenth aspect, alone or in combination with one or more of the first through fifteenth aspects, the UE may identify a RACH resource, of the respective RACH resources, based at least in part on an association between a synchronization signal block (SSB) time index of the selected beam and the RACH resource associated with the selected beam.

In a seventeenth aspect, alone or in combination with one or more of the first through sixteenth aspects, the respective RACH resources are not contiguous in a frequency domain.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
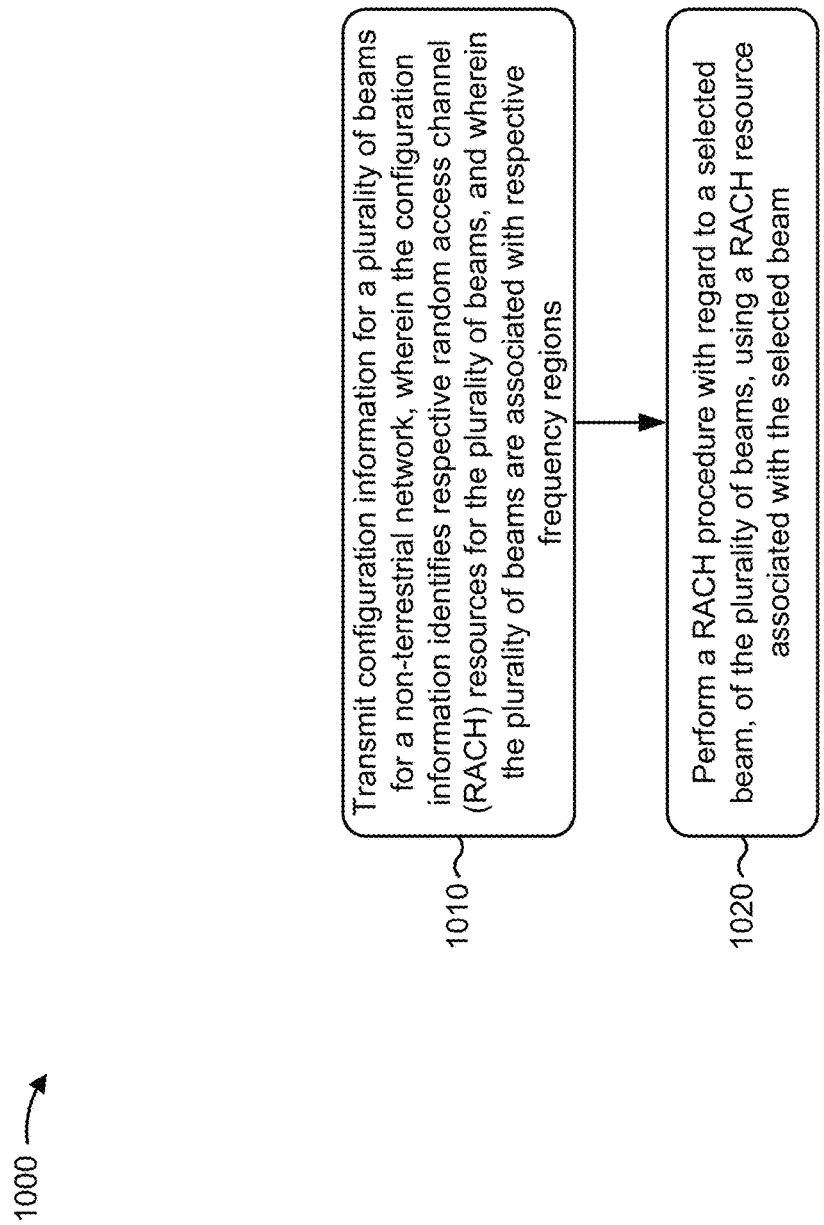
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where a base station (e.g., base station 110, a relay station, and/or the like) performs operations associated with random access channel frequency multiplexing for a non-terrestrial network.

As shown in FIG. 10, in some aspects, process 1000 may include transmitting configuration information for a plurality of beams for a non-terrestrial network, wherein the configuration information identifies respective random access channel (RACH) resources for the plurality of beams, and wherein the plurality of beams are associated with respective frequency regions (block 1010). For example, the base station (e.g., using controller/processor 240, transmit processor 220, TX MIMO processor 230, MOD 232, antenna 234, and/or the like) may transmit configuration information for a plurality of beams for a non-terrestrial network, as described above. In some aspects, the configuration information identifies respective random access channel (RACH) resources for the plurality of beams. In some aspects, the plurality of beams are associated with respective frequency regions. In some aspects, a base station that provides the configuration information to a UE may not be the same base station as performs the RACH procedure with the UE.

As further shown in FIG. 10, in some aspects, process 1000 may include performing a RACH procedure with regard to a selected beam, of the plurality of beams, using a RACH resource associated with the selected beam (block 1020). For example, the base station (e.g., using antenna 234, DEMOD 232, MIMO detector 236, receive processor 238, controller/processor 240, and/or the like) may perform a RACH procedure with regard to a selected beam, of the plurality of beams, using a RACH resource associated with the selected beam, as described above.

Process 1000 may include additional aspects, such as any single implementation or any combination of aspects described below and/or in connection with one or more other processes described elsewhere herein.

In a first aspect, at least one RACH resource, of the respective RACH resources, is outside of a frequency region associated with a corresponding beam of the plurality of beams.

In a second aspect, alone or in combination with the first aspect, each RACH resource, of the respective RACH resources, is within a corresponding frequency region associated with a respective beam of the plurality of beams.

In a third aspect, alone or in combination with the first aspect and/or the second aspect, the respective RACH resources are configured jointly.

In a fourth aspect, alone or in combination with one or more of the first through third aspects, the respective RACH resources are configured independently from each other.

In a fifth aspect, alone or in combination with one or more of the first through fourth aspects, the respective RACH resources are on a bandwidth part or subband that does not overlap respective frequency regions of any of the plurality of beams.

In a sixth aspect, alone or in combination with one or more of the first through fifth aspects, the respective RACH resources are within a particular frequency region corresponding to a particular beam of the plurality of beams.

In a seventh aspect, alone or in combination with one or more of the first through sixth aspects, one or more first RACH resources, of the respective RACH resources, are on a bandwidth part or subband that does not overlap respective frequency regions of any beam of the plurality of beams.

In an eighth aspect, alone or in combination with one or more of the first through seventh aspects, one or more second RACH resources, of the respective RACH resources, are in a frequency region of a particular beam of the plurality of beams.

In a ninth aspect, alone or in combination with one or more of the first through eighth aspects, the respective RACH resources are multiplexed with each other.

In a tenth aspect, alone or in combination with one or more of the first through ninth aspects, the RACH resource associated with the selected beam selectively uses an expanded time window based at least in part on a bandwidth capability of the base station.

In an eleventh aspect, alone or in combination with one or more of the first through tenth aspects, when the bandwidth capability indicates that the base station supports a bandwidth wider than a frequency region of a beam of the plurality of beams, the expanded time window is not used.

In a twelfth aspect, alone or in combination with one or more of the first through eleventh aspects, when the bandwidth capability indicates that the base station does not support a bandwidth wider than the frequency region of the beam, the expanded time window is used.

In a thirteenth aspect, alone or in combination with one or more of the first through twelfth aspects, the expanded time window is used when the RACH resource associated with the selected beam is on a bandwidth part or subband that does not overlap a frequency region of the selected beam for which the RACH procedure is to be performed.

In a fourteenth aspect, alone or in combination with one or more of the first through thirteenth aspects, the at least one RACH resource is provided adjacent to an edge or in an overlapped area of the frequency region associated with the corresponding beam.

In a fifteenth aspect, alone or in combination with one or more of the first through fourteenth aspects, the at least one RACH resource is multiplexed with another RACH resource corresponding to a beam with a frequency region in which the at least one RACH resource is located.

In a sixteenth aspect, alone or in combination with one or more of the first through fifteenth aspects, the base station may transmit information indicating an association between a synchronization signal block (SSB) time index of the selected beam and the RACH resource associated with the selected beam.

In a seventeenth aspect, alone or in combination with one or more of the first through sixteenth aspects, the base station may identify the RACH resource based at least in part on an association between a synchronization signal block (SSB) time index of the selected beam and the RACH resource associated with the selected beam.

In an eighteenth aspect, alone or in combination with one or more of the first through seventeenth aspects, the respective RACH resources are not contiguous in a frequency domain.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving, from a network node, configuration information identifying locations of each respective random access channel (RACH) resource of a plurality of RACH resources corresponding to a plurality of beams associated with a non-terrestrial network, the plurality of beams being associated with respective frequency regions;
    detecting a selected beam, of the plurality of beams, in accordance with the configuration information; and
    performing a RACH procedure using a RACH resource, of the plurality of RACH resources,
        the RACH resource being outside of a frequency region associated with the network node, and
        the RACH resource being associated with a guard region in accordance with the network node comprising a first type of network node, a bandwidth capability of the first type of network node not supporting a bandwidth wider than the frequency region associated with the network node,
        the guard region providing an amount of time for a performance, by the network node, of a retuning operation,
        the network node configured to perform the retuning operation comprising retuning to or from the frequency region associated with the network node, and
        the RACH resource not being associated with the guard region in accordance with the network node comprising a second type of network node, a bandwidth capability of the second type of network node supporting the bandwidth wider than the frequency region associated with the network node.

2. The method of claim 1, further comprising:
    detecting a selected beam, of the plurality of beams, in accordance with the configuration information, wherein the RACH resource is outside of a frequency region associated with the selected beam.

3. The method of claim 1, wherein each RACH resource, of the respective RACH resources, is within a corresponding frequency region associated with a respective beam of the plurality of beams.

4. The method of claim 1, wherein the respective RACH resources are configured jointly.

5. The method of claim 1, wherein the respective RACH resources are configured independently from each other, and the configuration information is beam-specific.

6. The method of claim 1, wherein the respective RACH resources are within a particular frequency region corresponding to a particular beam of the plurality of beams.

7. The method of claim 1, wherein one or more second RACH resources, of the respective RACH resources, are in a particular frequency region of a particular beam of the plurality of beams.

8. The method of claim 1, wherein the respective RACH resources are multiplexed with each other.

9. The method of claim 1, further comprising:
    performing an operation to resolve a conflict between the RACH resource and another uplink transmission in the guard region.

10. The method of claim 1, wherein at least one RACH resource, of the respective RACH resources, is provided adjacent to an edge or in an overlapped area of a frequency region associated with a corresponding beam.

11. The method of claim 10, wherein one or more first RACH resources, corresponding to one or more first beams of the plurality of beams, are multiplexed with one or more second RACH resources, corresponding to one or more second beams of the plurality of beams, in a frequency region in which the one or more first RACH resources are located.

12. The method of claim 1, further comprising:
    detecting a selected beam, of the plurality of beams, in accordance with the configuration information;
    receiving information indicating an association between a synchronization signal block (SSB) time index associated with the selected beam and the RACH resource; and
    identifying the RACH resource in accordance with the information indicating the association.

13. The method of claim 1, further comprising:
    detecting a selected beam, of the plurality of beams, in accordance with the configuration information; and identifying the RACH resource in accordance with an association between a synchronization signal block (SSB) time index, of the selected beam, and the RACH resource.

14. The method of claim 1, wherein the respective RACH resources are not contiguous in a frequency domain.

15. A method of wireless communication performed by a network node, comprising:
   transmitting configuration information for a plurality of beams for a non-terrestrial network, the configuration information identifying each of a plurality of random access channel (RACH) resources corresponding to the plurality of beams, and the plurality of beams being associated with respective frequency regions;
   transmitting a selected beam, of the plurality of beams, in accordance with the configuration information; and
   performing a RACH procedure using a RACH resource, of the plurality of RACH resources,
      the RACH resource being outside of a frequency region associated with the network node, and
      the RACH resource being associated with a guard region in accordance with the network node comprising a first type of network node, a bandwidth capability of the first type of network node not supporting a bandwidth wider than the frequency region associated with the network node,
      the guard region providing an amount of time for a performance, by the network node, of a retuning operation,
      the network node configured to perform the retuning operation comprising retuning to or from the frequency region associated with the network node, and
      the RACH resource not being associated with the guard region in accordance with the network node comprising a second type of network node, a bandwidth capability of the second type of network node supporting the bandwidth wider than the frequency region associated with the network node.

16. The method of claim 15, wherein the RACH resource is outside of a frequency region associated with the selected beam.

17. The method of claim 15, wherein each RACH resource, of the respective RACH resources, is within a corresponding frequency region associated with a respective beam of the plurality of beams.

18. The method of claim 15, wherein the respective RACH resources are configured jointly.

19. The method of claim 15, wherein the respective RACH resources are configured independently from each other.

20. The method of claim 15, wherein the respective RACH resources are within a particular frequency region corresponding to a particular beam of the plurality of beams.

21. The method of claim 15, wherein one or more second RACH resources, of the respective RACH resources, are in a frequency region of a particular beam of the plurality of beams.

22. The method of claim 15, wherein the respective RACH resources are multiplexed with each other.

23. The method of claim 15, wherein the RACH resource selectively uses an expanded time window in accordance with the bandwidth capability of the network node.

24. A user equipment (UE) for wireless communication, comprising:
   a memory; and
   one or more processors, coupled to the memory, configured to:
      receive, from a network node, configuration information identifying locations of each of a plurality of random access channel (RACH) resources corresponding to a plurality of beams associated with a non-terrestrial network, wherein the plurality of beams are associated with respective frequency regions;
      detect a selected beam, of the plurality of beams, based at least in part on the configuration information; and
      perform a RACH procedure using a RACH resource, of the plurality of RACH resources,
         the RACH resource being outside a frequency region associated with the network node, and
         the RACH resource being associated with a guard region in accordance with the network node comprising a first type of network node, a bandwidth capability of the first type of network node not supporting a bandwidth wider than the frequency region associated with the network node,
         the guard region providing an amount of time for a performance, by the network node, of a retuning operation,
         the network node configured to perform the retuning operation comprising the retuning to or from the frequency region associated with the network node, and
         the RACH resource not being associated with the guard region in accordance with the network node comprising a second type of network node, a bandwidth capability of the second type of network node supporting the bandwidth wider than the frequency region associated with the network node.

25. The UE of claim 24, further comprising:
   detecting a selected beam, of the plurality of beams, in accordance with the configuration information, wherein the RACH resource is outside of a frequency region associated with the selected beam.

26. The UE of claim 24, wherein at least one of:
   the respective RACH resources are on a bandwidth part or subband that does not overlap a respective frequency region associated with any of the plurality of beams, or
   one or more second RACH resources, of the respective RACH resources, are in a frequency region of a particular beam of the plurality of beams.

27. The UE of claim 24, wherein each RACH resource, of the respective RACH resources, is within a corresponding frequency region associated with a respective beam of the plurality of beams.

28. A network node for wireless communication, comprising:
   a memory; and
   one or more processors coupled to the memory, configured to:
      transmit configuration information for a plurality of beams for a non-terrestrial network, the configuration information identifying a plurality of random access channel (RACH) resources corresponding to the plurality of beams, and the plurality of beams being associated with respective frequency regions;
      transmit a selected beam, of the plurality of beams, in accordance with the configuration information; and
      perform a RACH procedure using a RACH resource, of the plurality of RACH resources, and the RACH resource being associated with a guard region in accordance with the network node comprising a first type of network node, a bandwidth capability of the first type of network node not supporting a bandwidth wider than a frequency region associated with the network node, the guard region providing an amount of time for a performance, by the network node, of a retuning operation, the network node configured to perform the retuning operation comprising retuning to or from the frequency region associated with the network node, and the RACH resource not being associated with the guard region in accordance with the network node comprising a second type of network node, a bandwidth capability of the second type of network node supporting the bandwidth wider than the frequency region associated with the network node.

29. The network node of claim 28, wherein the RACH resource is outside of a frequency region associated with the selected beam.

30. The network node of claim 28, wherein at least one of:
the respective RACH resources are on a bandwidth part or subband that does not overlap a respective frequency region associated with any of the plurality of beams, or
one or more second RACH resources, of the respective RACH resources, are in a frequency region of a particular beam of the plurality of beams.

* * * * *